US010755328B2

(12) United States Patent
Huang

(10) Patent No.: US 10,755,328 B2
(45) Date of Patent: Aug. 25, 2020

(54) METHOD AND MOBILE TERMINAL DEVICE FOR CERTIFYING WEBPAGE

(71) Applicant: TENCENT TECHNOLOGY (SHENZHEN) COMPANY LIMITED, Shenzhen (CN)

(72) Inventor: Jiangquan Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 702 days.

(21) Appl. No.: 14/718,228

(22) Filed: May 21, 2015

(65) Prior Publication Data
US 2015/0254747 A1 Sep. 10, 2015

Related U.S. Application Data

(63) Continuation of application No. PCT/CN2013/088288, filed on Dec. 2, 2013.

(30) Foreign Application Priority Data

Dec. 4, 2012 (CN) .......................... 2012 1 0512337

(51) Int. Cl.
*G06Q 30/00* (2012.01)
*G06Q 30/06* (2012.01)
(Continued)

(52) U.S. Cl.
CPC ... *G06Q 30/0617* (2013.01); *G06F 16/24565* (2019.01); *G06F 16/958* (2019.01);
(Continued)

(58) Field of Classification Search
None
See application file for complete search history.

(56) References Cited

U.S. PATENT DOCUMENTS 7,050,993 B1 * 5/2006 Piikivi .................. G06Q 20/04
705/27.1
7,627,527 B1 * 12/2009 Hildebrand ............ G06Q 20/10
705/39

(Continued)

FOREIGN PATENT DOCUMENTS

CN        1547144 A      11/2004
CN      101009005 A       8/2007
(Continued)

OTHER PUBLICATIONS

C. Custer, "UCWeb and UnionPay Announce New Mobile Payment Solution", Apr. 24, 2012, www.techinasia.com (https://www.techinasia.com/ucweb-unionpay-announce-mobile-payment-solution) (Year: 2012).*

(Continued)

*Primary Examiner* — Naeem U Haq
*Assistant Examiner* — Norman Donald Sutch, Jr.
(74) *Attorney, Agent, or Firm* — Morgan, Lewis & Bockius LLP

(57) ABSTRACT

The present disclosure discloses a method and a mobile terminal device for certifying a webpage. The method is implemented as follows. A mobile browser detects whether a link contained in a payment request initiated by a user is a payment link. The mobile browser sends the payment link to a third party certification plug-in if the link contained in the payment request is the payment link. The third party certification plug-in performs a certification process according to the payment link, generates and displays a certification webpage, generates a payment result webpage after the user inputs payment information on the certification webpage, and sends a link corresponding to the payment result webpage to the mobile browser. The mobile browser displays the payment result webpage.

12 Claims, 3 Drawing Sheets

(51) Int. Cl.
*G06F 16/958* (2019.01)
*G06F 16/2455* (2019.01)
*H04L 29/08* (2006.01)
*H04W 12/08* (2009.01)
*G06Q 20/32* (2012.01)
*H04L 29/06* (2006.01)

(52) U.S. Cl.
CPC ....... *G06Q 20/322* (2013.01); *H04L 63/0428* (2013.01); *H04L 67/02* (2013.01); *H04W 12/08* (2013.01)

(56) References Cited

U.S. PATENT DOCUMENTS

| | | | | |
|---|---|---|---|---|
| 8,301,500 | B2* | 10/2012 | Pharris | G06Q 20/102 |
| | | | | 705/17 |
| 2002/0128981 | A1* | 9/2002 | Kawan | G06Q 20/02 |
| | | | | 705/67 |
| 2006/0218391 | A1* | 9/2006 | Glazer | G06F 21/33 |
| | | | | 713/152 |
| 2007/0100928 | A1* | 5/2007 | Sylthe | G06F 17/30905 |
| | | | | 709/200 |
| 2007/0282739 | A1* | 12/2007 | Thomsen | G06Q 20/10 |
| | | | | 705/39 |
| 2007/0288392 | A1* | 12/2007 | Peng | G06Q 20/04 |
| | | | | 705/72 |
| 2008/0103923 | A1* | 5/2008 | Rieck | G06Q 20/12 |
| | | | | 705/26.41 |
| 2010/0169293 | A1* | 7/2010 | Gerber | G06F 16/951 |
| | | | | 707/706 |
| 2011/0246374 | A1* | 10/2011 | Franz | G06Q 20/085 |
| | | | | 705/77 |
| 2013/0151414 | A1* | 6/2013 | Zhu | G06Q 20/3552 |
| | | | | 705/44 |

FOREIGN PATENT DOCUMENTS

| | | |
|---|---|---|
| CN | 101378312 A | 3/2009 |
| CN | 102117455 A * | 7/2011 |
| JP | 2009282875 A | 12/2009 |
| WO | WO-2005/064503 A1 | 7/2005 |
| WO | WO-2009/138848 A2 | 11/2009 |

OTHER PUBLICATIONS

Search Report in International Application No. PCT/CN2013/088288 dated Feb. 27, 2014.
Office Action in CN Application No. 201210512337.1 dated Apr. 7, 2017, 7 pages.
International Preliminary Report on Patentability and Written Opinion in International Application No. PCT/CN2013/088288 dated Jun. 9, 2015, 8 pages.

* cited by examiner

METHOD AND MOBILE TERMINAL DEVICE FOR CERTIFYING WEBPAGE

This application is a continuation of International Application No. PCT/CN2013/088288, filed on Dec. 2, 2013. This application claims the benefit and priority of Chinese Patent Application No. 201210512337.1, filed on Dec. 4, 2012. The entire disclosures of each of the above applications are incorporated herein by reference.

TECHNICAL FIELD

The present disclosure relates to Internet technologies, and more particularly to a method and a mobile terminal device for certifying a webpage.

BACKGROUND

At present, if a payment process is to be performed on a personal computer (PC), it is required to install a payment plug-in on a browser of the PC. When a user submits an order and pays for purchased goods, the payment plug-in may protect a process of inputting an account number and a password. In this way, it is difficult for a vicious third party application to intercept payment information of the user, thereby ensuring property security of the user.

Limited to the performance of mobile terminal device and the function of browser installed on the mobile terminal device, a payment plug-in based on a mobile browser has not been provided. The mobile browser is a webpage browser applied to a mobile terminal device such as a mobile phone or a Personal Digital Assistant (PDA). When submitting an order and performing payment on the mobile browser, the user may directly input payment information on the mobile browser without the protection of special payment plug-in.

With the fast development of mobile Internet technologies, the number of mobile Internet users has exceeded the number of PC Internet users. More and more users do shopping and perform payment through mobile browsers. Accordingly, vicious software begins to flood the mobile terminal systems of the users, which seriously endangers the payment information and property of the users.

SUMMARY OF THE INVENTION

Examples of the present disclosure provide a method and a mobile terminal device for certifying a webpage, so as to securely and rapidly implement a whole certification process on a mobile browser of a mobile terminal device.

A method for certifying a webpage includes:

detecting, by a mobile browser, whether a link contained in a payment request initiated by a user is a payment link;

sending, by the mobile browser, the payment link to a third party certification plug-in if the link contained in the payment request is the payment link;

performing, by the third party certification plug-in, a certification process according to the payment link, generating and displaying a certification webpage, generating a payment result webpage after the user inputs payment information on the certification webpage, and sending a link corresponding to the payment result webpage to the mobile browser; and displaying, by the mobile browser, the payment result webpage.

A mobile terminal device for certifying a webpage includes a detecting module, a sending module, a certifying module and a displaying module, wherein the detecting module is to detect whether a link contained in a payment request initiated by a user is a payment link;

the sending module is to send the payment link to the certifying module if the link contained in the payment request is the payment link;

the certifying module is to perform a certification process according to the payment link, generate and display a certification webpage, generate a payment result webpage after the user inputs payment information on the certification webpage, and send a link corresponding to the payment result webpage to the displaying module; and the displaying module is to display the payment result webpage.

According to the method and the mobile terminal device for certifying a webpage, a whole certification process may be implemented securely and rapidly on the mobile browser of the mobile terminal device.

BRIEF DESCRIPTION OF DRAWINGS

The accompanying drawings referred to in the examples are illustrated briefly hereinafter. Obviously, these accompanying drawings are some examples of the present disclosure, and according to these accompanying drawings, those skilled in the art can obtain other accompanying drawings without creative labor.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

In order to make the technical solution and merits of the present disclosure clearer, the present disclosure will be illustrated hereinafter with reference to the accompanying drawings and specific examples.

Figure 1:
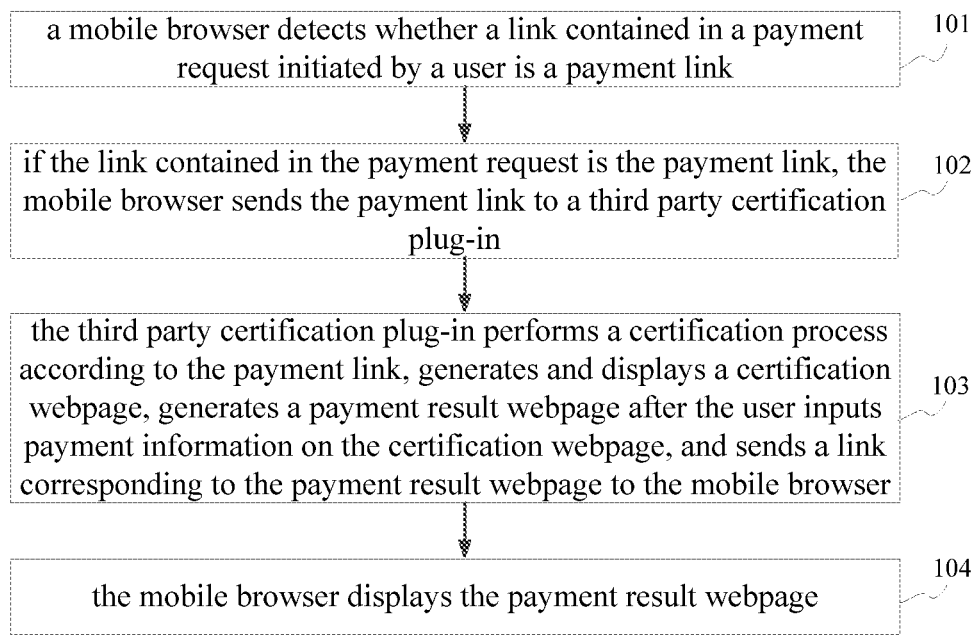
FIG. 1 is a schematic flowchart illustrating a method for certifying a webpage according to an example of the present disclosure.

FIG. 1 is a schematic flowchart illustrating a method for certifying a webpage according to an example of the present disclosure. As shown in FIG. 1, the method includes following blocks.

At block 101, a mobile browser detects whether a link contained in a payment request initiated by a user is a payment link.

At block 102, if the link contained in the payment request is the payment link, the mobile browser sends the payment link to a third party certification plug-in.

At block 103, the third party certification plug-in performs a certification process according to the payment link, generates and displays a certification webpage, generates a payment result webpage after the user inputs payment information on the certification webpage, and sends a link corresponding to the payment result webpage to the mobile browser.

At block 104, the mobile browser displays the payment result webpage.

By the method for certifying a webpage, a whole certification process may be implemented securely and rapidly on the mobile browser of a mobile terminal device.

Figure 2:
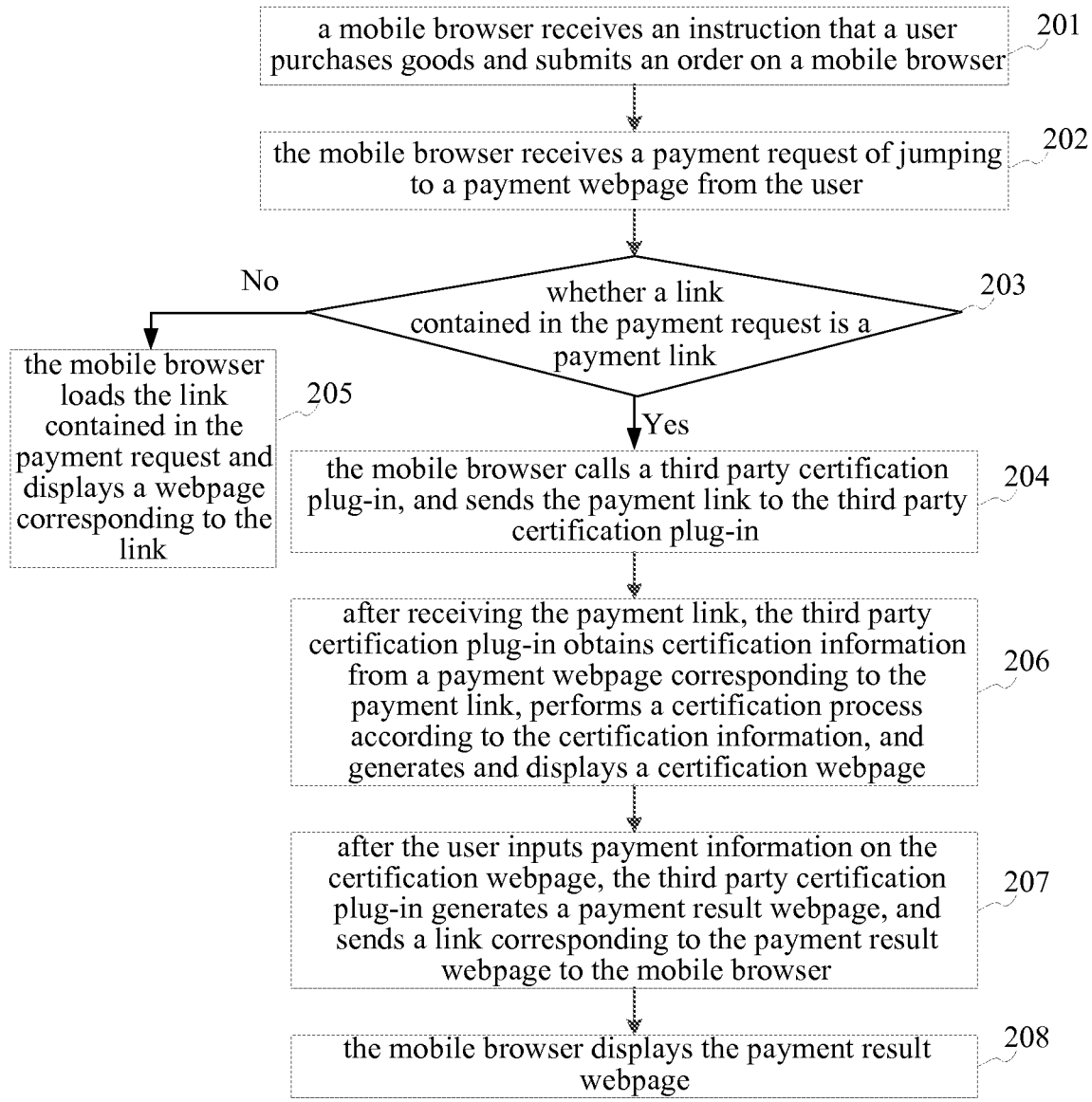
FIG. 2 is a schematic flowchart illustrating a method for certifying a webpage according to another example of the present disclosure.

FIG. 2 is a schematic flowchart illustrating a method for certifying a webpage according to another example of the present disclosure. The method may be applied to a payment process. As shown in FIG. 2, the method includes following blocks.

At block 201, a mobile browser receives an instruction that a user purchases goods and submits an order on a mobile browser.

At block 202, the mobile browser receives a payment request of jumping to a payment webpage from the user.

At block 203, the mobile browser detects whether a link contained in the payment request is a payment link. If the link contained in the payment request is the payment link, block 204 is performed. If the link contained in the payment request is not the payment link, block 205 is performed.

In an implementation, if the mobile browser uses a WebKit kernel, the mobile browser calls a shouldStartLoadWithRequest function when the user initiates the payment request. The mobile browser may intercept the payment request initiated by the user through the shouldStartLoadWithRequest function, and detects whether a Uniform Resource Locator (URL) contained in the payment request is the payment link. If it is the payment link that is contained in the payment request, the payment link has been encrypted.

At block 204, the mobile browser calls a third party certification plug-in, and sends the payment link to the third party certification plug-in.

In an implementation, the third party certification plug-in may be a special payment plug-in, and is separated from the mobile browser.

At block 205, the mobile browser loads the link contained in the payment request and displays a webpage corresponding to the link.

At block 206, after receiving the payment link, the third party certification plug-in obtains certification information from a payment webpage corresponding to the payment link, performs a certification process according to the certification information, and generates and displays a certification webpage.

In an implementation, because the payment link has been encrypted, the third party certification plug-in may decrypt the payment link after receiving the payment link, and then obtains the certification information from the payment webpage.

In an implementation, the certification information includes information that needs to be confirmed when the user pays for the purchased goods. The certification information may include at least one piece of goods information, payer information, payee information, payment amount and an order number. For example, if the user purchases a book named "XX maxim", the goods information is "XX maxim", the payer information is "bank account information of the user", the payee information is "bank account information of seller", the payment amount is "36.00 yuan" and the order number is "369878894".

At block 207, after the user inputs payment information on the certification webpage, the third party certification plug-in generates a payment result webpage, and sends a link corresponding to the payment result webpage to the mobile browser.

In an implementation, the third party certification plug-in may encrypt the link corresponding to the payment result webpage, and sends a message to the mobile browser, wherein the encrypted link is contained in the message as a parameter of the message. In this way, the payment security may be ensured.

At block 208, the mobile browser displays the payment result webpage.

In an implementation, if the link sent to the mobile browser by the third party certification plug-in has been encrypted, the mobile browser calls a decryption algorithm provided by the third party certification plug-in, decrypts the encrypted link, and displays the payment result webpage corresponding to the link.

In an example, after the mobile browser receives the instruction that the user purchases goods and submits an order on the mobile browser, the method may further include displaying a payment trigger.

In an implementation, if the user intends to pay for the purchased goods after submitting the order, the user may trigger the payment trigger through an operation such as a click or a double click. The operation of triggering the payment trigger by the user indicates that the user initiates the payment request. Accordingly, after the payment trigger is triggered, the mobile browser may receive the payment request of jumping to the payment webpage from the user.

In an implementation, the payment trigger may be payment button or a trigger component that may communicate with the user. On a webpage, a displaying content corresponding to the payment trigger may be "click payment", and may be displayed in the form of hyperlink. The displaying content corresponding to the payment trigger may also be "confirm payment", and may be displayed in the form of payment button. For example, an oval pattern is drawn on the payment button.

The payment trigger may be triggered by user click or another mode.

After the user triggers the payment trigger, the mobile browser sends the payment link to the third party certification plug-in if the link contained in the payment request is the payment link. If the link contained in the payment request is not the payment link, the mobile browser does not send the link to the third party certification plug-in, but loads the link. In an implementation, the payment link is sent to the third party certification plug-in as a parameter of a message. Moreover, the mobile browser does not display the payment webpage corresponding to the payment link.

By the method for certifying a webpage, a whole certification process may be implemented securely and rapidly on the mobile browser of a mobile terminal device.

Figure 3:
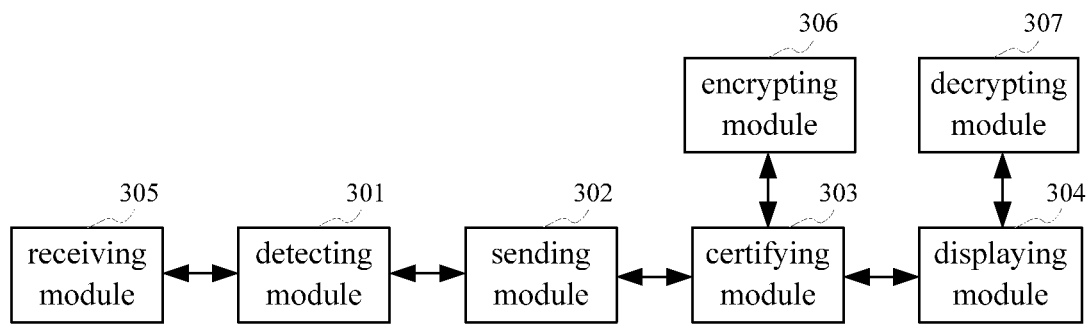
FIG. 3 is a schematic diagram illustrating the structure of a mobile terminal device for certifying a webpage according to an example of the present disclosure.

FIG. 3 is a schematic diagram illustrating a mobile terminal device for certifying a webpage according to an example of the present disclosure. As shown in FIG. 3, the mobile terminal device includes a detecting module 301, a sending module 302, a certifying module 303 and a displaying module 304.

The detecting module 301 may detect whether a link contained in a payment request initiated by a user is a payment link The sending module 302 may send the payment link to the certifying module 303 if the link contained in the payment request is the payment link.

The certifying module 303 may perform a certification process according to the payment link, generate and display a certification webpage, generate a payment result webpage after the user inputs payment information on the certification webpage, and send a link corresponding to the payment result webpage to the displaying module 304.

The displaying module 304 may display the payment result webpage.

In an implementation, the mobile terminal device further includes a receiving module 305.

The receiving module 305 may receive an instruction that the user purchases goods and submits an order on a mobile browser, and receive a payment request of jumping to a payment webpage from the user.

In an implementation, the displaying module 304 may further display a payment trigger. An operation of triggering the payment trigger by the user indicates that the user initiates the payment request.

In an implementation, the mobile terminal device further includes an encrypting module 306 and a decrypting module 307.

The encrypting module 306 may encrypt the link corresponding to the payment result webpage.

The decrypting module 307 may decrypt the link encrypted by the encrypting module 306.

In an implementation, the certifying module 303 may obtain certification information from the payment webpage corresponding to the payment link, and perform the certification process according to the certification information.

In an implementation, the certification information may include at least one piece of goods information, payer information, payee information, payment amount and an order number.

In an implementation, if the link contained in the payment request is not the payment link, the displaying module 304 may load the link and display a webpage corresponding to the link.

Figure 4:
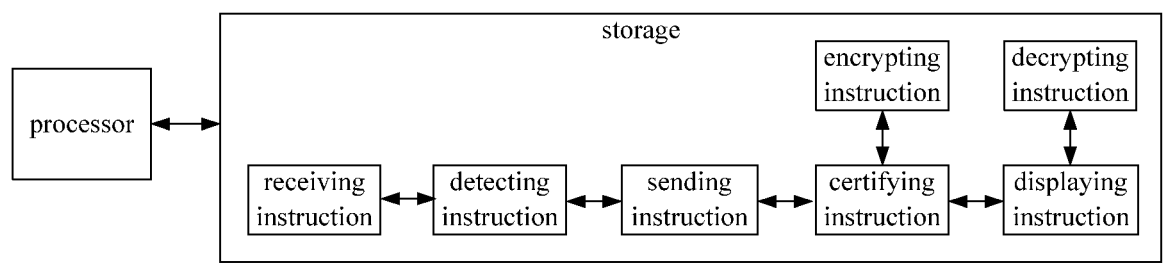
FIG. 4 is a schematic diagram illustrating the structure of a mobile terminal device for certifying a webpage according to another example of the present disclosure.

FIG. 4 is a schematic diagram illustrating the structure of a mobile terminal device for certifying a webpage according to another example of the present disclosure. As shown in FIG. 4, the mobile terminal device for certifying a webpage at least includes a storage and a processor communicating with the storage, in which the storage includes a detecting instruction, a sending instruction, a certifying instruction and a displaying instruction that can be executed by the processor. The storage may be a non-transitory computer readable storage medium and the detecting instruction, the sending instruction, the certifying instruction and the displaying instruction may be machine readable instructions stored in the storage. The processor may also execute the machine readable instructions stored in the storage.

The detecting instruction may detect whether a link contained in a payment request initiated by a user is a payment link.

The sending instruction may send the payment link to the certifying instruction if the link contained in the payment request is the payment link.

The certifying instruction may perform a certification process according to the payment link, generate and display a certification webpage, generate a payment result webpage after the user inputs payment information on the certification webpage, and send a link corresponding to the payment result webpage to the displaying instruction.

The displaying instruction may display the payment result webpage.

In an implementation, the mobile terminal device further includes a receiving instruction.

The receiving instruction may receive an instruction that the user purchases goods and submits an order on a mobile browser, and receive a payment request of jumping to a payment webpage from the user.

In an implementation, the displaying instruction may further display a payment trigger. An operation of triggering the payment trigger by the user indicates that the user initiates the payment request.

In an implementation, the mobile terminal device further includes an encrypting instruction and a decrypting instruction.

The encrypting instruction may encrypt the link corresponding to the payment result webpage.

The decrypting instruction may decrypt the link encrypted by the encrypting instruction.

In an implementation, the certifying instruction may obtain certification information from the payment webpage corresponding to the payment link, and perform the certification process according to the certification information.

In an implementation, the certification information may include at least one piece of goods information, payer information, payee information, payment amount and an order number.

In an implementation, if the link contained in the payment request is not the payment link, the displaying instruction may load the link and display a webpage corresponding to the link.

According to the above examples, it can be clearly understood by those skilled in the art that the present disclosure may be realized by software accompanying with necessary general hardware platforms, or by hardware. In many cases, the former is a preferred manner. Based on this, the essential part of the technical solution of the present disclosure or the part contributed to the prior art may be in the form of a software product, and the computer software product is stored in a storage medium (such as a ROM/RAM, a diskette or a CD) and includes several codes to make a computer device (such as a handset, a personal computer, a server or a network device) perform the method in the examples of the present disclosure.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for certifying a webpage, comprising:
    displaying, by a mobile browser running on a mobile terminal device, a first webpage;

detecting, by the mobile browser running on the mobile terminal device, a payment request initiated by a user via the first webpage, the payment request including a first link;

in accordance with a determination that the first link contained in the payment request is a payment link:

sending, by the mobile browser running on the mobile terminal device, the payment link to a third party certification plug-in installed in the mobile terminal device, and wherein the third party certification plug-in is a payment plug-in and is separated from the mobile browser;

performing, by the third party certification plug-in installed in the mobile terminal device, a certification process according to the payment link, comprising:

decrypting, by the third party certification plug-in installed in the mobile terminal device, the payment link;

obtaining, by the third party certification plug-in installed in the mobile terminal device, certification information from the decrypted payment link, wherein the certification information includes (1) a first field requesting user input of payer financial account information and (2) a second field showing payee financial account information;

generating and displaying a certification webpage based on the certification information obtained from the decrypted payment link;

receiving, on the certification webpage displayed by the third party certification plug-in, user input providing payment information to fill in the first field of the payer financial account information in the certification information that is required for performing the certification process, wherein the user input does not include login information for logging into a pre-registered user account; and generating, by the third party certification plug-in, a payment result webpage after the user inputs the payment information on the certification webpage and the third party certification plug-in successfully verifies the payment information with a third party financial server;

encrypting, by the third party certification plug-in installed in the mobile terminal device, a second link corresponding to the payment result webpage;

sending, by the third party certification plug-in installed in the mobile terminal device, the encrypted second link corresponding to the payment result webpage to the mobile browser;

decrypting, by the mobile browser running on the mobile terminal device, the second link encrypted by the third party certification plug-in; and displaying, by the mobile browser running on the mobile terminal device, the payment result webpage corresponding to the second link;

in accordance with a determination that the first link contained in the payment request is not a payment link:

loading, by the mobile browser running on the mobile terminal device, the first link and displaying a second webpage corresponding to the first link.

2. The method of claim 1, before the mobile browser detects whether the link contained in the payment request initiated by the user is the payment link, further comprising:

receiving, by the mobile browser running on the mobile terminal device, an instruction that the user purchases goods and submits an order on the mobile browser, and receiving the payment request of jumping to a payment webpage from the user.

3. The method of claim 2, after the mobile browser receives the instruction that the user purchases goods and submits the order on the mobile browser, further comprising:

displaying, by the mobile browser running on the mobile terminal device, a payment trigger, wherein an operation of triggering the payment trigger by the user indicates that the user initiates the payment request.

4. The method of claim 1, wherein the certification information further includes at least one piece of goods information, payment amount and an order number.

5. A mobile terminal device for certifying a webpage, comprising a processor and a non-transitory storage, wherein the non-transitory storage stores one or more machine readable instructions, and the processor executes the machine readable instructions stored in the non-transitory storage to cause a mobile browser running on the mobile terminal device to display a first webpage and detect a payment request initiated by a user via the first webpage, the payment request including a first link;

in accordance with a determination that the first link contained in the payment request is a payment link:

cause the mobile browser to send the payment link to a third party certification plug-in installed in the mobile terminal device, wherein the third party certification plug-in is a payment plug-in and is separated from the mobile browser;

cause the third party certification plug-in to perform a certification process according to the payment link, comprising cause the third party certification plug-in to:

decrypt, by the third party certification plug-in installed in the mobile terminal device, the payment link;

obtain certification information from the decrypted payment link, wherein the certification information includes (1) a first field requesting user input of payer financial account information and (2) a second field showing payee financial account information;

generate and display a certification webpage based on the certification information obtained from the decrypted payment link;

receive, on the certification webpage displayed by the third party certification plug-in, user input providing payment information to fill in the first field of the payer financial account information in the certification information that is required for performing the certification process, wherein the user input does not include login information for logging into a pre-registered user account; and generate a payment result webpage after the user inputs the payment information on the certification webpage and the third party certification plug-in successfully verifies the payment information with a third party financial server;

cause the third party certification plug-in to encrypt a second link corresponding to the payment result webpage;

cause the third party certification plug-in to send the encrypted second link corresponding to the payment result webpage to the mobile browser;

cause the mobile browser to decrypt running on the mobile terminal device the second link encrypted by the third party certification plug-in; and cause the mobile browser to display the payment result webpage corresponding to the second link;

in accordance with a determination that the first link contained in the payment request is not a payment link:

cause the mobile browser to load the first link and display a second webpage corresponding to the first link.

6. The mobile terminal device of claim 5, wherein the processor executes the machine readable instructions stored in the non-transitory storage to:

cause the mobile browser to receive an instruction that the user purchases goods and submits an order on the mobile browser, and receive the payment request of jumping to a payment webpage from the user.

7. The mobile terminal device of claim 6, wherein the processor executes the machine readable instructions stored in the non-transitory storage to cause the mobile browser to display a payment trigger, wherein an operation of triggering the payment trigger by the user indicates that the user initiates the payment request.

8. The mobile terminal device of claim 5, wherein the certification information further includes at least one piece of goods information, payment amount and an order number.

9. A non-transitory computer readable storage medium storing one or more machine readable instructions that, when executed by a mobile terminal having a processor for certifying a webpage, cause the processor to cause a mobile browser running on the mobile terminal device to display a first webpage and detect a payment request initiated by a user via the first webpage, the payment request including a first link;

in accordance with a determination that the first link contained in the payment request is a payment link:

cause the mobile browser to send the payment link to a third party certification plug-in installed in the mobile terminal device, wherein the third party certification plug-in is a payment plug-in and is separated from the mobile browser;

cause the third party certification plug-in to perform a certification process according to the payment link, comprising cause the third party certification plug-in to:

decrypt, by the third party certification plug-in installed in the mobile terminal device, the payment link;

obtain certification information from the decrypted payment link, wherein the certification information includes (1) a first field requesting user input of payer financial account information and (2) a second field showing payee financial account information;

generate and display a certification webpage based on the certification information obtained from the decrypted payment link;

receive, on the certification webpage displayed by the third party certification plug-in, user input providing payment information to fill in the first field of the payer financial account information in the certification information that is required for performing the certification process, wherein the user input does not include login information for logging into a pre-registered user account; and generate a payment result webpage after the user inputs the payment information on the certification webpage and the third party certification plug-in successfully verifies the payment information with a third party financial server;

cause the third party certification plug-in to encrypt a second link corresponding to the payment result webpage;

cause the third party certification plug-in to send the encrypted second link corresponding to the payment result webpage to the mobile browser;

cause the mobile browser to decrypt running on the mobile terminal device the second link encrypted by the third party certification plug-in; and cause the mobile browser to display the payment result webpage corresponding to the second link;

in accordance with a determination that the first link contained in the payment request is not a payment link:

cause the mobile browser to load the first link and display a second webpage corresponding to the first link.

10. The non-transitory computer readable storage medium of claim 9, wherein the processor executes the machine readable instructions stored in the non-transitory storage to:

cause the mobile browser to receive an instruction that the user purchases goods and submits an order on the mobile browser, and receive the payment request of jumping to a payment webpage from the user.

11. The non-transitory computer readable storage medium of claim 10, wherein the processor executes the machine readable instructions stored in the non-transitory storage to cause the mobile browser to display a payment trigger, wherein an operation of triggering the payment trigger by the user indicates that the user initiates the payment request.

12. The non-transitory computer readable storage medium of claim 9, wherein the certification information further includes at least one piece of goods information, payment amount and an order number.

* * * * *